(12) United States Patent
Robaina

(10) Patent No.: US 12,104,639 B2
(45) Date of Patent: Oct. 1, 2024

(54) FASTENER ASSEMBLY

(71) Applicant: Roberto E. Robaina, Cerritos, CA (US)

(72) Inventor: Roberto E. Robaina, Cerritos, CA (US)

(73) Assignee: RDI (Robaina Design Innovations) LLC, Cerritos, CA (US)

( * ) Notice: Subject to any disclaimer, the term of this patent is extended or adjusted under 35 U.S.C. 154(b) by 202 days.

(21) Appl. No.: 17/681,766

(22) Filed: Feb. 26, 2022

(65) Prior Publication Data

US 2022/0275824 A1    Sep. 1, 2022

Related U.S. Application Data

(60) Provisional application No. 63/153,961, filed on Feb. 26, 2021.

(51) Int. Cl.
*F16B 21/18* (2006.01)
*F16B 41/00* (2006.01)

(52) U.S. Cl.
CPC .................................. *F16B 41/002* (2013.01)

(58) Field of Classification Search
CPC .............................. F16B 41/04; F16B 41/002
USPC ....... 411/974, 970, 302, 365, 349, 346, 999, 411/353
See application file for complete search history.

(56) References Cited

U.S. PATENT DOCUMENTS

| | | | | |
|---|---|---|---|---|
| 2,625,721 A * | 1/1953 | Lockhart | ............... | B65D 45/32 24/19 |
| 3,415,302 A * | 12/1968 | Beck | ..................... | F16B 37/044 411/350 |
| 3,502,130 A * | 3/1970 | Gulistan | ............... | F16B 41/002 29/512 |
| 4,274,460 A | 6/1981 | Egner | | |
| 5,462,395 A * | 10/1995 | Damm | .................. | F16B 41/002 411/107 |
| 5,741,101 A * | 4/1998 | Gulistan | ............... | F16B 21/086 411/107 |
| 6,955,512 B2 * | 10/2005 | Allen | ....................... | H05K 7/14 211/26 |

(Continued)

FOREIGN PATENT DOCUMENTS

| | | |
|---|---|---|
| DE | 202016007455 U1 | 1/2017 |
| GB | 191415832 A | 1/1915 |

OTHER PUBLICATIONS

PCT/US2022/018053, International Search Report & Written Opinion (Jul. 8, 2022), 11 pages.

*Primary Examiner* — Gary W Estremsky
(74) *Attorney, Agent, or Firm* — Heidi Eisenhut; LOZA & LOZA, LLP

(57) ABSTRACT

A fastener assembly having a novel capture feature, or features, integrated within a unique and a newly defined portion of the fastener which protrudes from the working surface is provided. The fastener assembly comprises a bolt and a circular clip. The bolt comprises a threaded shank having a longitudinal axis and a transverse axis orthogonal to the longitudinal axis; a head section continuous with the shank, the head section comprising a head; a washer portion; and a groove integrally formed between the head and the washer portion. The circular clip is configured to be received within the groove of the head section.

11 Claims, 8 Drawing Sheets

(56) References Cited

U.S. PATENT DOCUMENTS

| | | | |
|---|---|---|---|
| 7,347,189 B2* | 3/2008 | Anello | F02M 61/14 |
| | | | 123/470 |
| 8,142,124 B2* | 3/2012 | Kulesha | F16B 41/002 |
| | | | 411/533 |
| 8,526,736 B2* | 9/2013 | Yamada | H04N 1/6027 |
| | | | 382/174 |
| 8,622,673 B2* | 1/2014 | Wong | F16B 5/0266 |
| | | | 411/347 |
| 8,979,458 B2* | 3/2015 | Sun | H01L 23/4006 |
| | | | 411/353 |
| 2005/0286992 A1 | 12/2005 | Shindoh | |
| 2008/0038950 A1* | 2/2008 | Haro | H01R 11/26 |
| | | | 439/220 |
| 2009/0022566 A1* | 1/2009 | Chretien | F16B 43/00 |
| | | | 411/353 |
| 2013/0045062 A1 | 2/2013 | Tao et al. | |
| 2019/0293108 A1* | 9/2019 | Sandwall | F16B 41/002 |

* cited by examiner

FASTENER ASSEMBLY

CLAIM OF PRIORITY UNDER 35 U.S.C. § 119

The present application for patent claims priority to U.S. Provisional Application No. 63/153,961 entitled "UTILITY BOLT DESIGN WITH MULTITUDE OF ATTACHMENTS", filed Feb. 26, 2021, and is hereby expressly incorporated by reference herein.

FIELD

Various embodiments of the invention pertain to bolts and other fasteners and fastener assemblies.

BACKGROUND

Fasteners, such as bolts, are among the most prolific means of mechanically securing two objects together. Bolts are used and required on products in every household, in every construction project, on every vehicle type, and in every environment, land, sea, and space.

Thus, bolts have taken on many shapes and forms to fulfill certain rolls. Certain head styles and drive points have been adapted to generate more torque or fit flush to a surface, shoulders have been introduced when threading is not required along the full length of the shaft and or the shaft is in shear loading. Certain shoulders have then been designed to achieve specific goals, such as knurls and splines for specific interference fits.

Now, as an unintended geometry of some of the manufacturing processes of bolt making, specifically due to the thread rolling process, a void along the shank may be created. Such a void can be seen on some wheel hub bolts used in the automotive industry to attach wheels to wheel hubs. In this instance, where this void exists, it serves no practical purpose and is only a byproduct of the manufacturing method used to obtain the geometry for interference fit and threads. It is also true that this void sits within the structure and is unseen when in use.

But such a void could be designed as a useful feature to a bolt. Such a void, if accessible to the user in application, could house a multitude of components. Such a feature could allow for a capture device to retain clips that may attach the bolt to a surface, or act as an electrical conductor, or as a hub to a pulley, gear, or other form of power transmission. And while such a fastener could be extremely useful to a multitude of applications and industries, currently no such fastener exists.

Such a device is shown herein.

SUMMARY

In one aspect, is directed to a fastener assembly. The fastener assembly comprises a bolt and a clip. The bolt comprises a threaded shank having a longitudinal axis and a transverse axis orthogonal to the longitudinal axis and a head section continuous with the shank. The head section comprises a head; a washer portion; and a groove integrally formed between the head and the washer portion. The clip is configured to be received within the groove of the head section.

In another aspect, the diameter of the groove is smaller than the diameters of the head and the washer portion.

In yet another aspect, the clip rotates freely within the groove.

In yet another aspect, the clip connects a linkage during installation and removal procedures of the bolt.

In yet another aspect, wherein the linkage is a chain or cord.

In yet another aspect, the clip comprises a main circular portion; and an attachment portion, the attachment portion integrally connected to, and extending outwardly from, the main circular portion.

In yet another aspect, the clip is formed from a single spring wire during manufacturing.

In yet another aspect, the main circular portion is configured to be received within the groove of the head section of the bolt.

In yet another aspect, the attachment portion is configured to receive a linkage for attaching the fastener assembly to a structure.

In yet another aspect, the clip is configured to spring open upon application of pressure and snap closed within the groove when located.

In yet another aspect, the clip forms a gear having teeth for receipt into another toothed part.

In yet another aspect, the clip forms a pulley.

In yet another aspect, the clip comprises a first component and a second component that fasten together to form a solid snap ring.

In yet another aspect, the clip forms an electrical contact with the threaded shank.

In yet another aspect, the clip forms an insulator from the threaded shank.

In yet another aspect, a bolt with specific geometry and features capable of housing and locating specific attachments above the working structure and during the service of the bolt is provided.

In yet another aspect, a clip capable of mating or being received within a groove of a bolt head is provided. The groove is configured to receive a wire, chain, cordage or other form of attachment for securing the bolt to a structure.

In yet another, a bolt with specific geometry and features for housing multiple attachments above the working structure while in service, is provided.

In yet another aspect, a bolt is provided with the specific geometry defined to house the mating clip is located directly in the current head of the bolt for specific head styles.

In yet another aspect, a bolt with a through hole for running wire, tubing, cordage, or other thin items through the structure is provided.

In yet another aspect, the attachment is a mating attachment that is comprised of two separate components that snap, clip, or otherwise fasten together to form a solid snap ring and fit within the defined pocket of the bolt.

In yet another aspect, the snap ring or clip, when assembled onto the bolt, forms a multitude of geometries and functions to include pulleys, gear wheels, electrical contacts, connectors, and/or insulators to the bolt, or as a general hub for any number of purposes, is provided.

In yet another aspect, a bolt. ranging from nano size to as large a size as needed, with a multitude of attachments and functions is provided.

BRIEF DESCRIPTION OF DRAWINGS

Various features, nature and advantages may become apparent from the detailed description set forth below when taken in conjunction with the drawings in which like reference characters identify correspondingly throughout.

DETAILED DESCRIPTION

Figure 1:
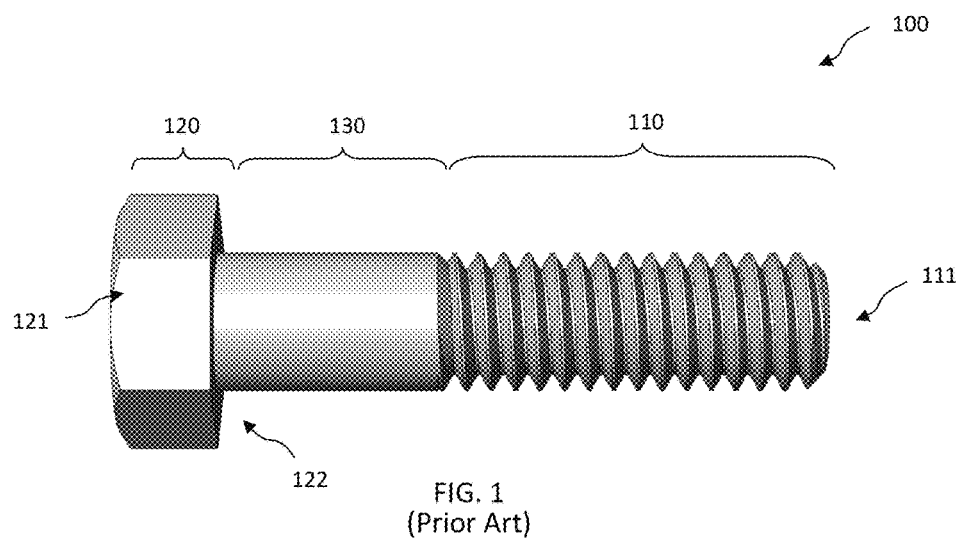
FIG. 1 illustrates a typical hex head bolt.

In the following description numerous specific details are set forth in order to provide a thorough understanding of the invention. However, one skilled in the art would recognize that the invention might be practiced without these specific details. In other instances, well known methods, procedures, and/or components have not been described in detail, so as not to unnecessarily obscure aspects of the invention.

Terms

The term "comprise" and variations, such as "comprising" and "comprises," are not intended to exclude other additives, components, integers or steps. "A", "an," and "the" and similar referents used herein are to be construed to cover both the singular and the plural unless their usage in context indicates otherwise. The word "exemplary" is used herein to mean "serving as an example, instance, or illustration." Any implementation or embodiment described herein as "exemplary" is not necessarily to be construed as preferred or advantageous over other embodiments or implementations. Likewise, "embodiments" does not require that all embodiments include the discussed feature, advantage or mode of operation.

The term "aspect" does not require that all aspects of this disclosure include the discussed feature, advantage or mode of operation.

The term "coupled" is used herein to means the direct or indirect coupling between two objects. For example, if object A physically touches or couples to object B, and object B touches or couples to object C, then objects A and C may still be considered coupled to one another, even if they do not directly physically touch each other.

In a manufacturing and assembly environment, various components of structures, such as vehicles, may be mechanically coupled with each other using various fasteners. A fastener may refer to one or more components that may be used to join components or parts of a vehicle or other structure. For example, fasteners may include nuts, bolts, screws, rivets, and various other types of threaded/unthreaded fasteners used in industry. As used herein, a fastener may also refer to a combination of elements that has been used to fasten different parts of the vehicle or structure. For example, a fastener as described herein may refer to a combination of a nut and a bolt that may have been threaded together and installed at a particular location or position in an interface between two parts of the vehicle or structure. Such fasteners may comprise metals, plastics, or other materials. For example, fastener may refer to a cylindrical rivet comprising a metal body (e.g., aluminum, steel, etc.).

Overview

According to embodiments of the present invention, a fastener assembly having a novel capture feature, or features, integrated within a unique and a newly defined portion of the fastener which protrudes from the working surface is provided. The fastener assembly comprises a bolt and a circular clip. The bolt comprises a threaded shank having a longitudinal axis and a transverse axis orthogonal to the longitudinal axis; a head section continuous with the shank, the head section comprising a head; a washer portion; and a groove integrally formed between the head and the washer portion. The circular clip is configured to be received within the groove of the head section.

The groove (or defined pocket) is of purposeful design, such that a user can access the groove (or defined pocket) both before and or after installation of the fastener assembly into a workpiece. Additionally, the groove (or defined pocket) may provide geometry to capture and/or mate with other specific components, some of which are described herein.

Prior Art

FIG. 1 shows a typical bolt known in the prior art. As shown, the typical bolt 100 has a threaded portion 110 terminating at a first end 111 and a head portion 120 coupled to the threaded portion 110 terminating at a second end 121, the second end 121 opposite the first end 111 and adjacent to an under-head surface 122. The under-head surface 122 is designed to make contact with the structure (or workpiece) or a washer during installation of the bolt 100. The bolt 100 may include a smooth shank portion 130 depending on the function and design of the bolt, and many head styles may be utilized to accomplish different tasks.

Best practices suggest that the diameter of the shank portion 130 be at least equal to, or slightly greater than, the threaded portion 110, and the threads should be formed (via a secondary manufacturing operation known as thread rolling,) not cut, when strength is an issue. Thus, to achieve this, a bolt blank, prior to thread rolling, may have a diameter in the threaded portion 110 that is approximately the average diameter of the required major and minor thread dimension diameters. This threaded blank diameter would thus initially be smaller than the shank 130 diameter, prior to thread roll.

Figure 2:
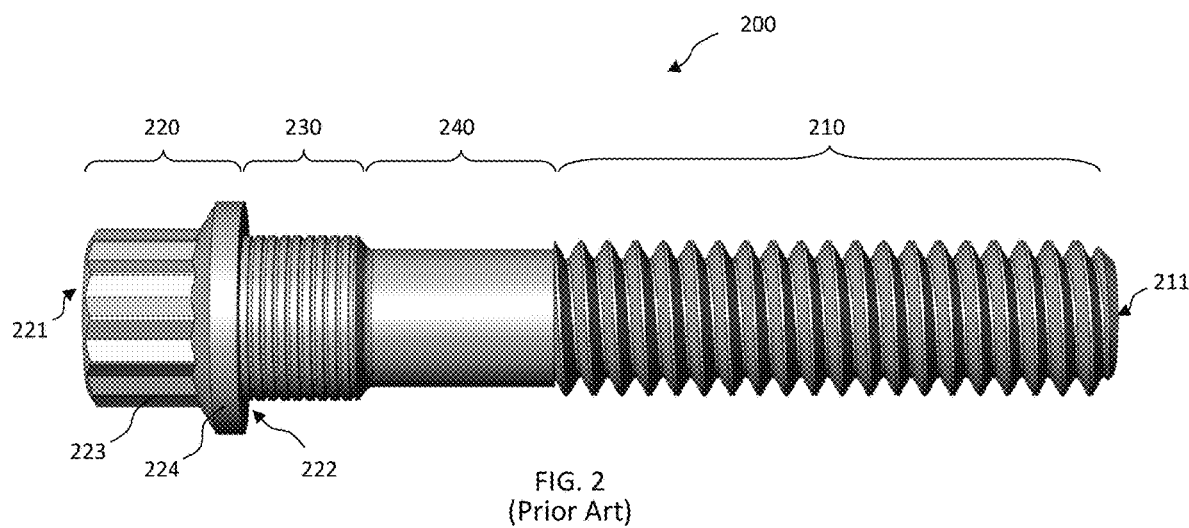
FIG. 2 illustrates prior art of a type of hub and bearing mounting bolt in accordance with an aspect.

Another typical bolt 200 is shown in FIG. 2. The bolt 200 is an example of a bolt commonly known as a Hub and Bearing Mounting Bolt, which is used in the automotive industry to mount wheels to their mating wheel hub (i.e., this is one example of a bolt that sticks out of the wheel hub when changing a tire on a vehicle). The bolt 200 has a threaded portion 210 terminating at a first end 211 and a head portion 220 coupled to the threaded portion 210 and terminating at a second end 221, the second end 221 opposite the first end 211 and adjacent to an under-head surface 222.

The head portion 220 comprises a 12-point hex 223 terminating at the second end 221, as well as a flange 224 coupled between the hex portion 223 and the under-head surface 222 which is designed to contact the structure for which the bolt 200 is being inserted. Coupled to the under-head surface 222 is an interference fit shoulder portion 230.

An undersized shank portion 240 is located between a standard threaded portion 210 and the interference fit shoulder 230. The interference fit shoulder 230 is designed to be press fit into the wheel hub in operation, keeping the bolt in place and in alignment. Thus, this diameter must be slightly larger than that of the undersized shank portion 240, and the standard threaded portion 210, as these portions are designed to slip into the structure. The diameter of the undersized shank portion 240 may be controlled by the requirements of the blank diameter for the standard threaded portion 210, such that during the initial heading manufacturing process used to create this bolt, the undersized shank portion 240 and the standard threaded portion 210 are the same diameter. It would only be after a thread roll manufacturing operation on the standard threaded portion 210 of the bolt that a difference in diameter would be created; where the thread major diameter would be larger than the undersized shank portion 240 diameter, the thread minor (or root) diameter would be smaller, and the thread pitch diameter would approximately equal that of the undersized shank portion 240.

Thus, by coincidence, the undersized shank portion 240 of this bolt 200 forms a type of void, pocket, or groove in that this diameter is smaller than that of both adjacent features. Similar, albeit smaller, formations exist whenever the thread runout utilizes an undercut on the shank to help terminate the thread rolling process. However, in all cases currently, this coincidental shank pocket (or groove) is designed to exist within the working structure when the bolt is in use. Thus, the user does not have access to this pocket (or groove) in use, nor is anything at any time intended to mate with or interact with this pocket (or groove). In actuality, this pocket (or groove) is often a geometric hindrance that bolt makers live with due to the nature of terminating the threads.

Faster Assembly

The following description of FIGS. 3-15 describe a novel fastener assembly with a defined pocket (or groove) of purposeful design, such that a user can access the defined pocket (or groove) both before and/or after installation, and which may provide geometry to capture and or mate with other specific components, example of which are described herein.

Figure 3:
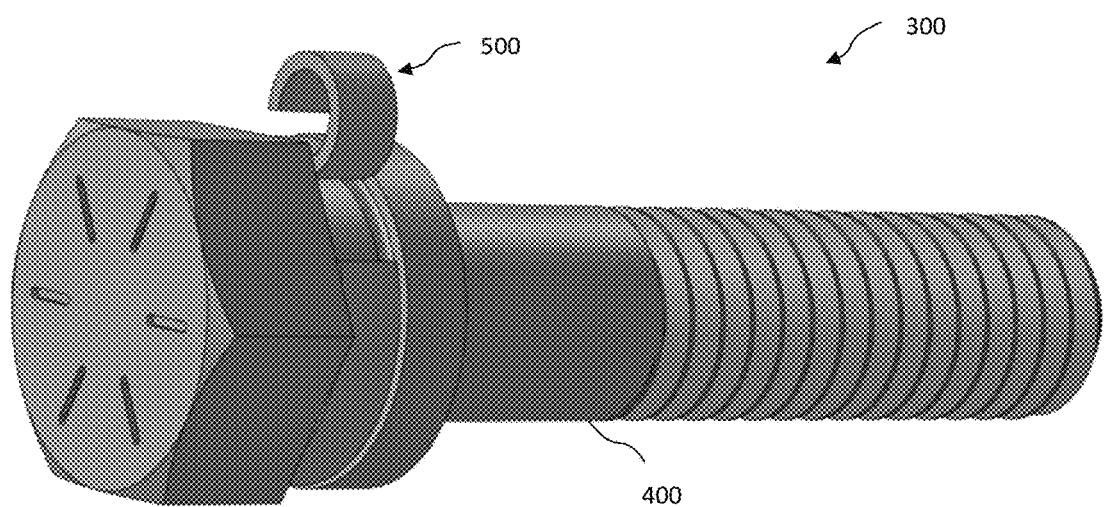
FIG. 3 illustrates a utility fastener, including bolt and circular clip, in accordance with an aspect of the present invention.
Figure 4:
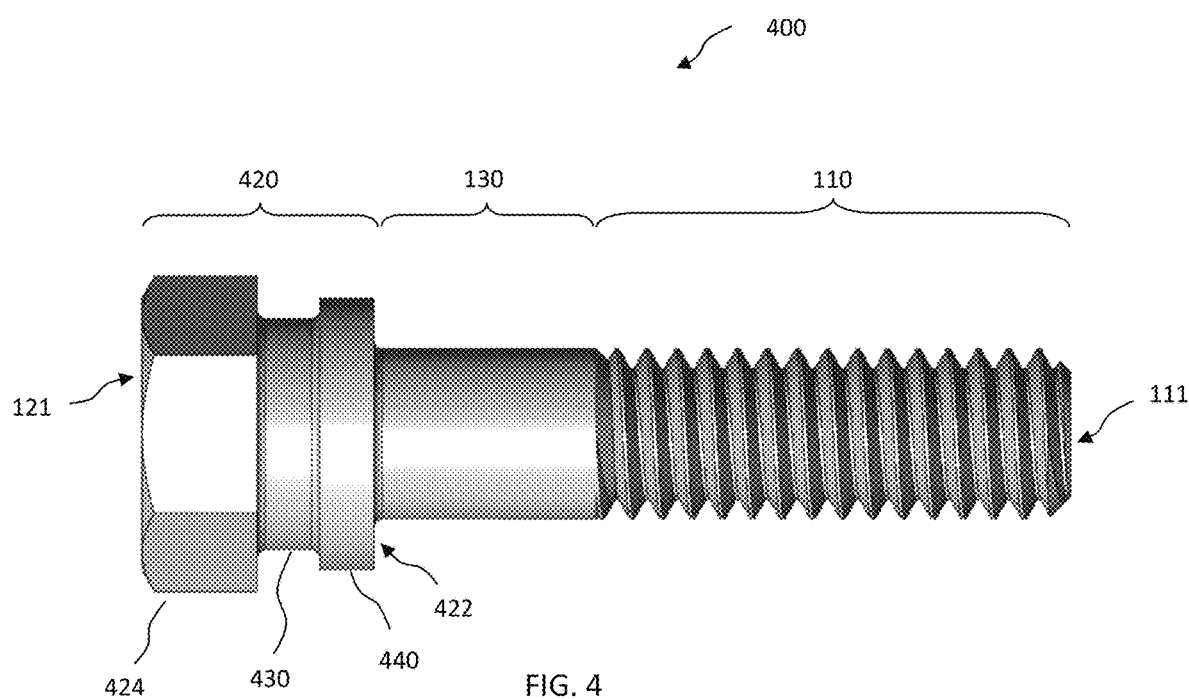
FIG. 4 illustrates the bolt component of the utility fastener, in accordance with an aspect of the present invention.
Figure 5:
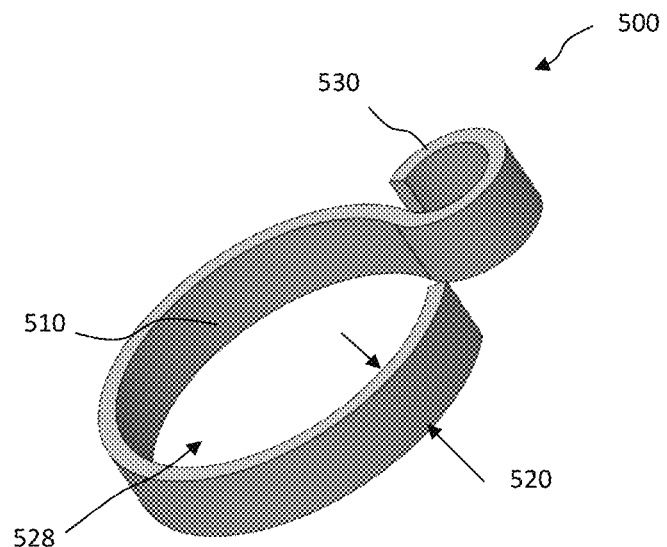
FIG. 5 illustrates the circular clip component of the utility fastener, in accordance with an aspect of the present invention.

FIG. 3 shows one aspect of a novel fastener assembly 300 of the present invention. This assembly 300 comprises a utility bolt 400, as seen in FIG. 4, as well as a circular clip 500, as seen in FIG. 5.

The utility bolt 400 maintains many of the same features of the typical bolts 100, 200 previously described. As shown, the bolt 400 may comprise a straight shank portion 130 coupled between a head section 420 and a threaded portion 110. The straight shank portion 130 and the threaded portion 110 may form a threaded shank having a longitudinal axis and a transverse axis orthogonal to the longitudinal axis. The head section 420 comprises an under-head surface 422. According to one embodiment, the straight shank portion 130 may be optional 130. The threaded portion 210 terminates at a first end 111 of the bolt 400 and the head section 420 at a second opposing end 121.

As with the bolts 100 and 200 described above with reference to FIGS. 1 and 2, the head section 420 of the bolt 400 can be of any protruding design to satisfy the design criteria of function and application. The head section 420 comprises a main head 424, a washer portion 440, and a groove located between, and integrally connected to, the main head 424 and the washer portion 440. However, differing from the head section 120 of the typical bolt 100 of FIG. 1, the head section 420 of the bolt 400 is elongated and further include the groove 430 which extends around the outer surface diameter of the bolt 400. In this aspect, the diameter of the groove 430 is less than the diameters of both the main head 424 and a washer portion 440 of the bolt. The under-head surface 422, designed to contact the structure or washer during installation, is located on the bottom side of the washer portion 440.

This new and novel groove 430, located within the head section 420 of the bolt 400 or fastener, is configured to receive (i.e., designed to mate with) and house the circular clip 500 when in use.

Figure 6:
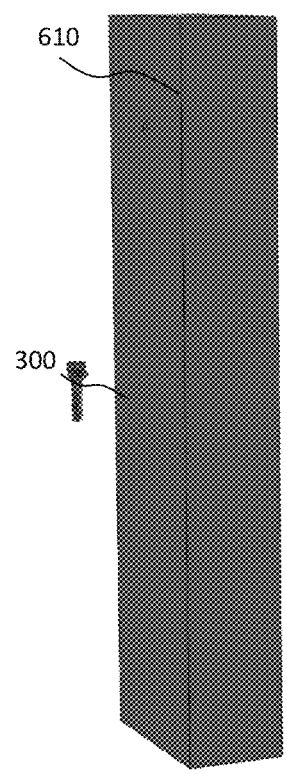
FIG. 6 illustrates the utility fastener secured to a structure prior to installation, in accordance with an aspect of the present invention.

The circular clip 500 may be made of a flat wire spring wrapped such that an inner diameter 510 mated with the diameter of the groove 430, and whose width 520 fit within the constraints of the head section 424 and the washer portion 440. The circular clip 500 may include a main circular portion 528 and an attachment portion 530 whose geometry may be created from the same wire during the wrapping manufacturing process, as seen in FIG. 5, or may be otherwise welded or similarly attached to the clip 500 (not shown). This attachment portion 530 is designed to accept a wire, chain, or other form of linkage such that the bolt can be attached to a structure 610, as seen in FIG. 6.

The main circular portion 528 and the attachment portion 530 of the clip 500 may be integrally formed together such that the clip 500 is in one piece. As shown, the diameter of the main circular portion is larger than the attachment portion 530

In this case, the circular clip 500 may be pressed in place within the defined groove 430, such that the clip springs open when pressure is applied, and snap closed into place within the defined groove 430, when adequately located.

The circular clip 500 housed or received within the groove 430 of the bolt 400 is designed to encapsulate the bolt while rotating freely within the confines of the housing, specifically during the installation and removal procedures. Thus, when the circular clip 500 is secured via wire, chain, or other linkage to a secondary structure, the bolt can be freely installed and removed without any impedance by the circular clip 500 or connecting linkage and this same fastener 300 will remain positively attached to a structure even when fully disengaged and removed from the structure.

ALTERNATE EMBODIMENTS

Figure 7:
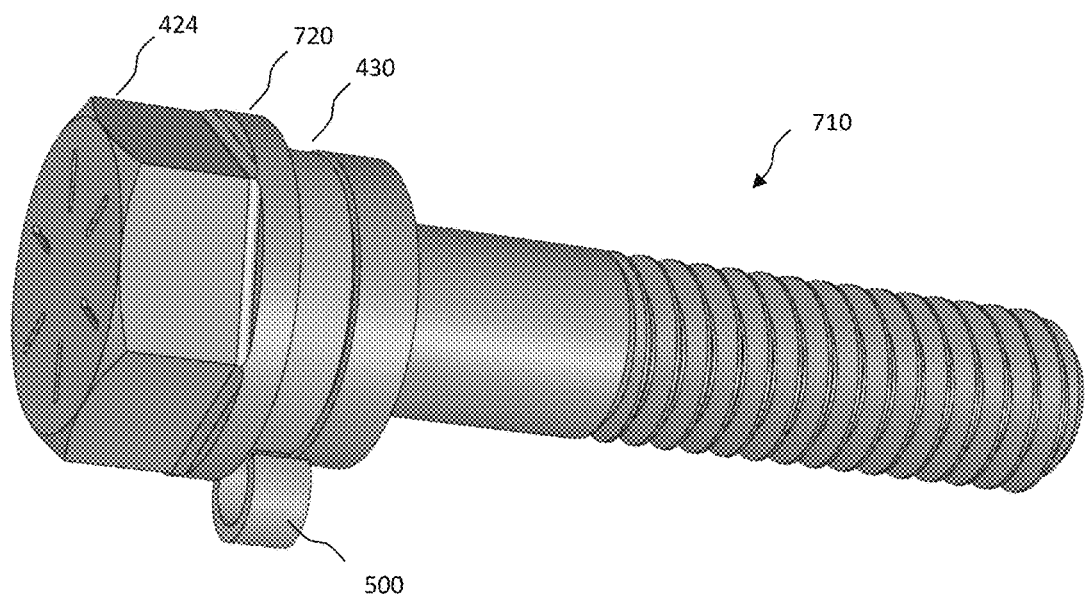
FIG. 7 illustrates a secondary embodiment of the utility fastener including a secondary protective flange washer, in accordance with an aspect of the present invention.

In an alternative embodiment, a bolt 710, similar to the bolt 400 in FIG. 4 is shown in FIG. 7. Unlike the bolt 400 in FIG. 4, the bolt 710 in FIG. 7 further comprises a flange washer portion 720 located between, and integrally connected to, the head section 424 and the groove 430 such that an installation tool cannot make contact with the clip 500 during installation or removal of the bolt.

Figure 8:
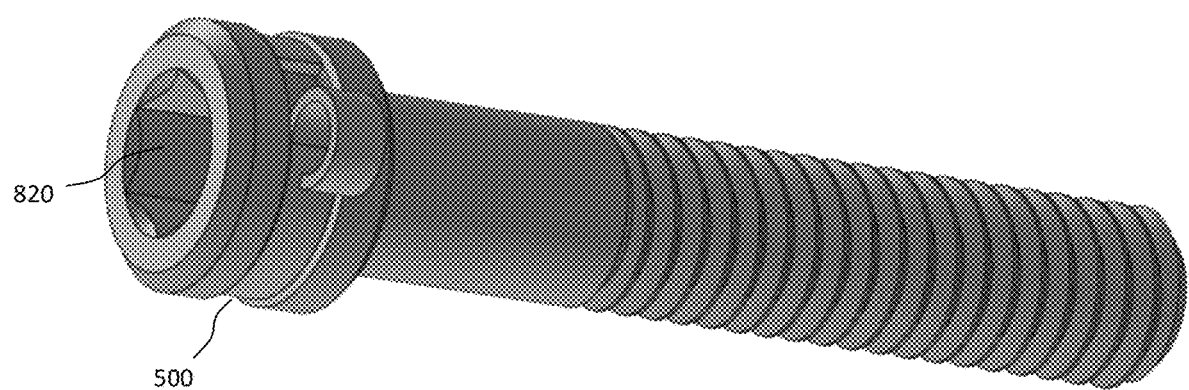
FIG. 8 illustrates a secondary embodiment of the utility fastener for internal drive fastener heads, in accordance with an aspect of the present invention.

In another alternate embodiment, as seen in FIG. 8, the protruding bolt head utilizes an internal drive system 820, such as an Allen wrench or torx drive socket head fasteners. In this embodiment, the current head of the bolt assembly (or fastener) can be modified to accept the circular clip 500 as the fastener head external geometry is not utilized by the installation tooling. Thus, this embodiment of the fastener does not require head elongation as compared to the standard fastener counterpart.

Figure 9:
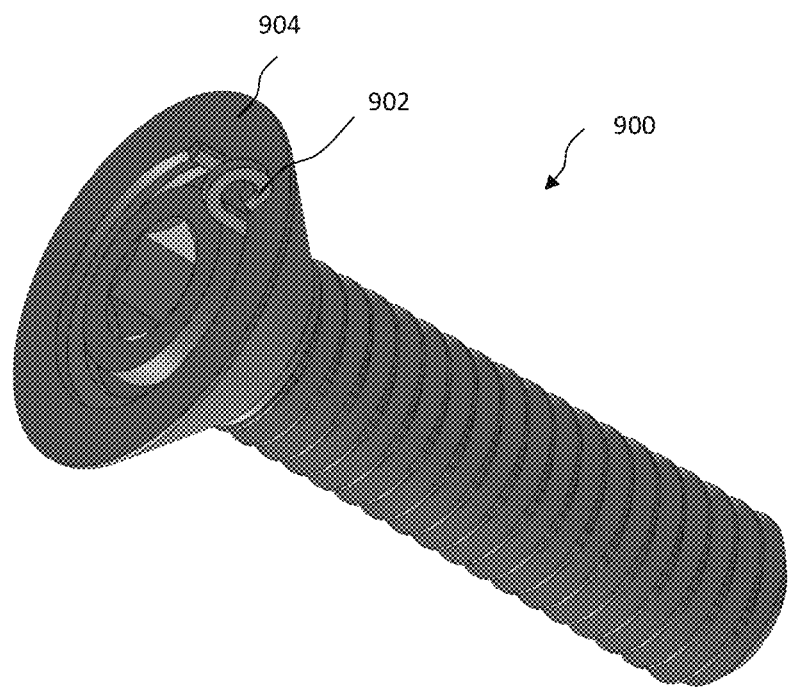
FIG. 9 illustrates a secondary embodiment of the utility fastener for flush head fasteners, in accordance with an aspect of the present invention.

In yet another embodiment, as seen in FIG. 9, a flush head fastener 900 may be adopted to accept a retaining clip 902. Such a clip 902 would be required to be housed entirely within the top portion of the fastener due to the nature of the flush head fastener. This retaining clip 902 fits into a circular race manufactured into the top of the fastener head 904 and encircling the drive feature of the fastener. It may be required that this clip 902 be easily removed and reengaged during use of the fastener, as a retaining clip 902 and resulting linkage would by definition not create a flush surface.

Figure 10:
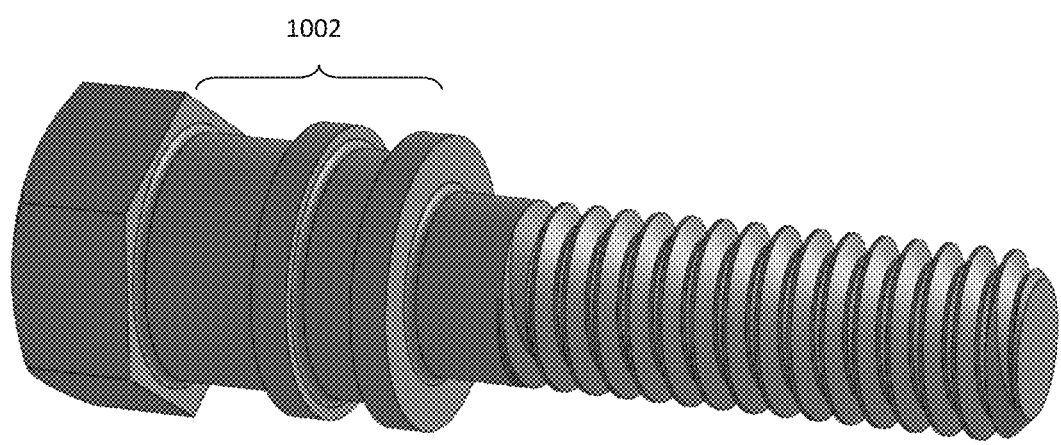
FIG. 10 illustrates a secondary embodiment of the utility fastener bolt with multiple grooves, in accordance with an aspect of the present invention.

In still another embodiment shown in FIG. 10, if design and application permit, any of the existing or herein defined protruding head fastener designs may utilize a modified captured washer such that a standard fastener may be used but the captured washer has a linkage feature designed to attach to and accept any wire, chain, or other linkage to connect the fastener to the required structure. As with typical captive washer bolts described briefly in the background of this document, this embodiment would require the unique washer to be placed on the blank bolt prior to the thread formation process.

Figure 11:
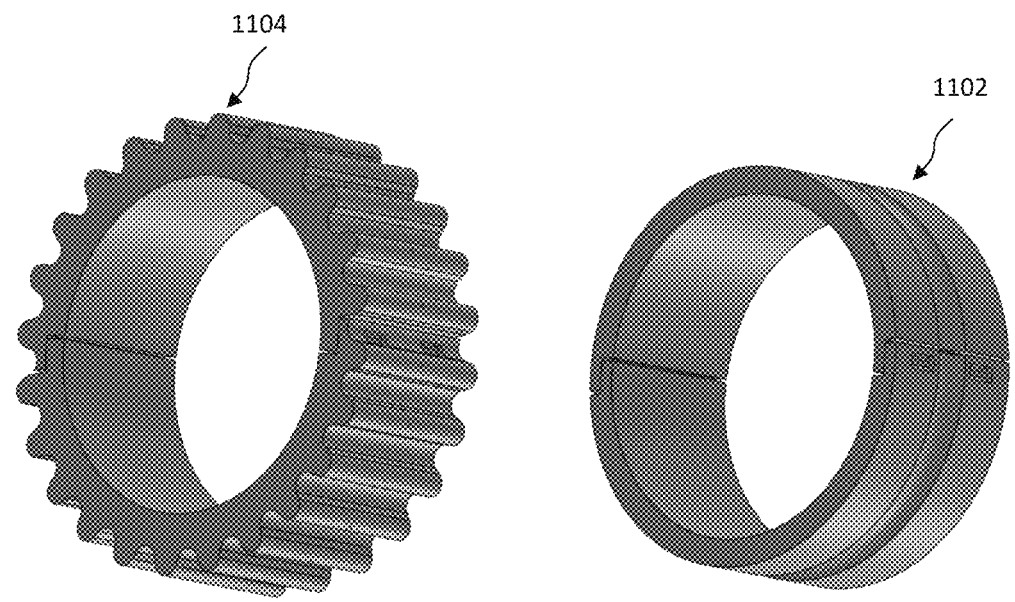
FIG. 11 illustrates secondary embodiments of the utility fastener attachment clips, in accordance with an aspect of the present invention.

In yet another embodiment shown in FIG. 10, multiple grooves 1002 could be provided with the fastener head. Each groove can house or receive a separate clip which may perform unique functions, beyond just providing attachment to the structure. Examples of such clips are shown in FIG. 11 and could act as pulley or gear wheels, electrical contacts, connectors, and/or insulators to the bolt, as required, or as a general hub for any number of purposes. A snap ring 1102 and a gear wheel 1104 are shown in FIG. 11.

Figure 12:
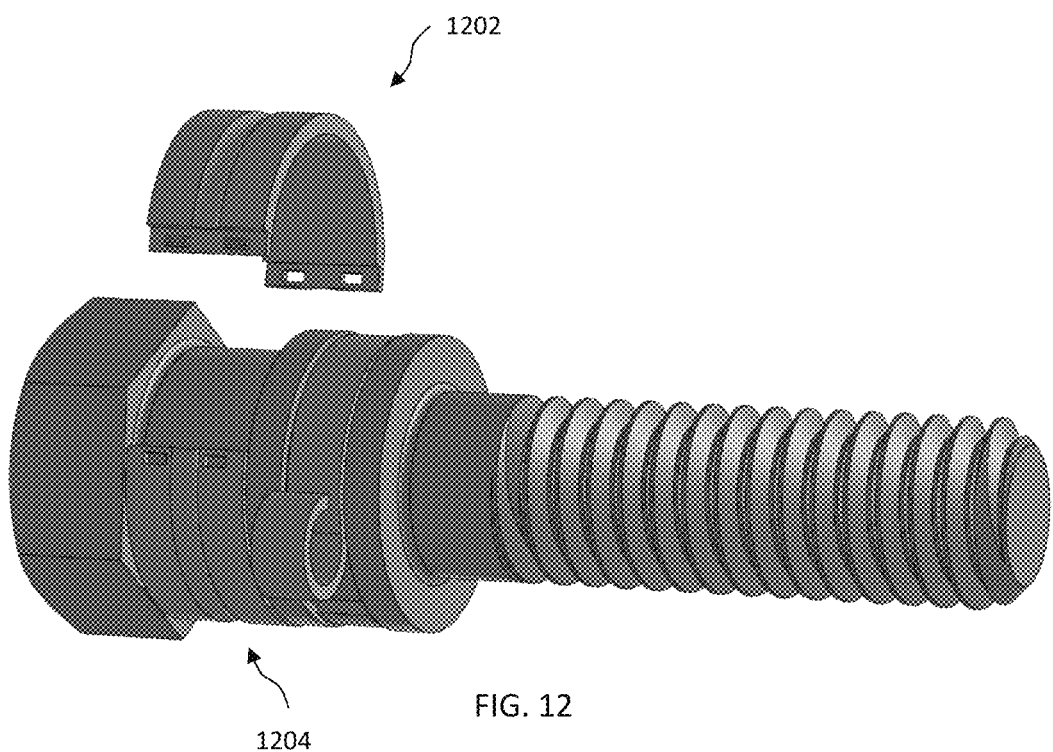
FIG. 12 illustrates a secondary embodiment of the utility fastener attachment clips being snapped in place within the corresponding groove (or bolt attachment pocket), in accordance with an aspect of the present invention.

Ideally, these hub clips may be manufactured in two halves and snap, or otherwise fasten, together in place within the defined groove, as seen in FIG. 12. This mechanism of snapping together too may take on many forms.

In another aspect, the attachment is a mating attachment comprised of two separate components (a first component 1202 and a second component 1204) that snap, clip, or otherwise fasten together to form a solid snap ring and fit within the defined pocket of the bolt.

In still another aspect, the snap ring or clip, when assembled onto the bolt, forms a multitude of geometries and functions to include pulleys, gear wheels, electrical contacts, connectors, and/or insulators to the bolt, or as a general hub for any number of purposes, is provided.

Figure 13:
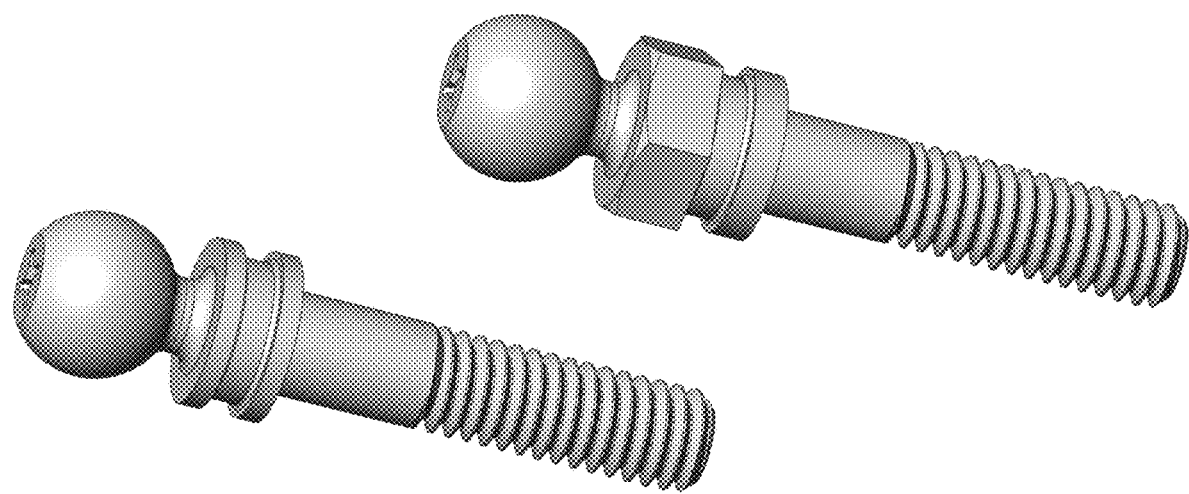
FIG. 13 illustrates a secondary embodiment of the utility fastener bolt with a hitch type fixture on the bolt head, in accordance with an aspect of the present invention.

In still another embodiment, the head of the fastener (or fastener assembly) may include extra features and geometry such as, but not limited to, a ball hitch as seen in FIG. 13, a stud pin, a bracket, or any other head protrusion as seen fit for the purpose of employing the fastener. Such a fastener may or may not include multiple drive options, such as Phillips Head recesses as well as Hex Head geometry, for installation purposes. This fastener, when installed into a primary structure, could act as a mechanical contact, connector, or support to secondary structures. Such a fastener would be extremely useful as the anchor point for telescoping measuring equipment, as well as in structures where subassemblies and continuously adjusted, removed and reattached, such as an SUV cargo cover.

Figure 14:
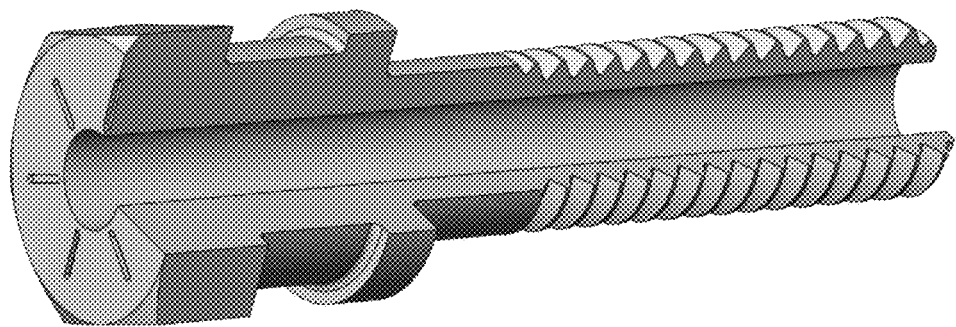
FIG. 14 illustrates a secondary embodiment of the utility fastener bolt with a through hole feature, in accordance with an aspect of the present invention.

In still one further embodiment of this fastener assembly as seen in FIG. 14, the bolt could include a through hole, such that a void exists through the entire length of the bolt. In this manner, wiring, tubing, cordage, or other necessary objects could freely pass through the inside of the bolt and thus to the other side of the structure. The through hole may also utilize and/or house a fiber optic line, optical beam, or any other type of optics, in order to act as or with a sensor, or as a visual aid.

In another embodiment of the present subject matter, a clip attachment may act as a shock absorber along the direction of the fastener shank.

In another embodiment, the fastening system of the present subject matter may be designed and employed as a nano or micro fastener.

Figure 15:
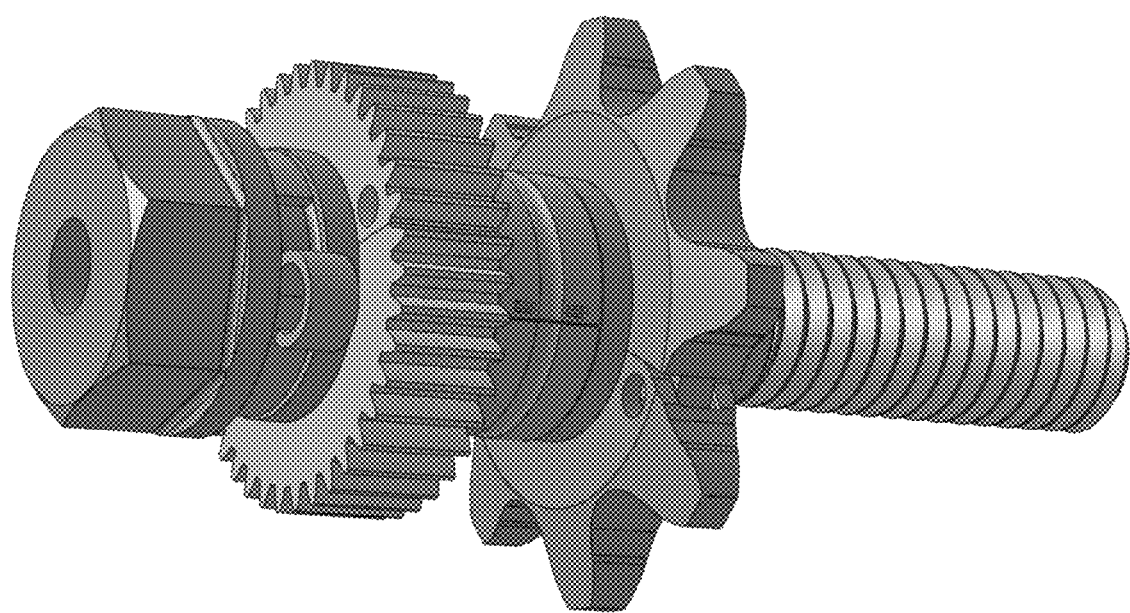
FIG. 15 illustrates a secondary embodiment of the utility fastener complete with a multitude of attachments and features, in accordance with an aspect of the present invention.

Finally, FIG. 15 shows the utility bolt with a multitude of attachments and features showing the versatility of this novel design.

Although the present subject matter and its advantages have been described in detail, it should be understood that various changes, substitutions and alterations can be made herein without departing from the spirit and scope of this disclosure as defined by the appended claims. Moreover, the scope of the present disclosure is not intended to be limited to the particular aspects of the process, machine, manufacture, composition of matter, means, methods and steps described herein. As one of ordinary skill in the art will readily appreciate from this disclosure of the present subject matter, processes, machines, manufacture, compositions of matter, means, methods, or steps, presently existing or later to be developed that perform substantially the same function or achieve substantially the same result as the corresponding features described herein may be utilized according to the present disclosure. Accordingly, the appended claims are intended to include within their scope such processes, machines, manufacture, compositions of matter, means, methods, or steps.

The invention claimed is:

1. A fastener assembly, comprising:
    a bolt, the bolt comprising:
        a threaded shank having a longitudinal axis and a transverse axis orthogonal to the longitudinal axis;
        a head section continuous with the shank, the head section comprising:
            a head;
            a washer portion; and
            a groove integrally formed between the head and the washer portion; and
    a clip configured to be received within the groove of the head section; and
    wherein the clip forms a gear having teeth for receipt into another toothed part.

2. The fastener assembly of claim 1, wherein the diameter of the groove is smaller than the diameters of the head and the washer portion.

3. The fastener assembly of claim 1, wherein the clip rotates freely within the groove.

4. The fastener assembly of claim 1, wherein the clip comprises:
  a main circular portion; and
  an attachment portion, the attachment portion integrally connected to, and extending outwardly from, the main circular portion.

5. The fastener assembly of claim 4, wherein the clip is formed from a single spring wire during manufacturing.

6. The fastener assembly of claim 5, wherein the main circular portion is configured to be received within the groove of the head section of the bolt.

7. The fastener assembly of claim 4, the attachment portion is configured to receive a linkage for attaching the fastener assembly to a structure.

8. The fastener assembly of claim 1, wherein the clip is configured to spring open upon application of pressure and snap closed within the groove when located.

9. The fastener assembly of claim 1, wherein the clip forms an electrical contact with the threaded shank.

10. A fastener assembly, comprising:
  a bolt, the bolt comprising:
    a threaded shank having a longitudinal axis and a transverse axis orthogonal to the longitudinal axis;
    a head section continuous with the shank, the head section comprising:
      a head;
      a washer portion; and
      a groove integrally formed between the head and the washer portion; and
  a clip configured to be received within the groove of the head section; and
  wherein the clip forms a pulley.

11. A fastener assembly, comprising:
  a bolt, the bolt comprising:
    a threaded shank having a longitudinal axis and a transverse axis orthogonal to the longitudinal axis;
    a head section continuous with the shank, the head section comprising:
      a head;
      a washer portion; and
      a groove integrally formed between the head and the washer portion; and
  a clip configured to be received within the groove of the head section; and
  wherein the clip comprises a first component and a second component that fasten together to form a solid snap ring.

* * * * *